United States Patent
Alexander et al.

[11] 3,866,328
[45] Feb. 18, 1975

[54] TRAILER HITCH GUIDE

[76] Inventors: Earl L. Alexander; Robert K. Taylor, both of 3427 W. 11th St., Wichita, Kans. 67203

[22] Filed: Jan. 11, 1974

[21] Appl. No.: 432,636

[52] U.S. Cl................................ 33/264, 116/28 R
[51] Int. Cl.............................................. G01c 5/00
[58] Field of Search......... 33/264, 180 R; 116/28 R; 280/477; 340/282

[56] References Cited
UNITED STATES PATENTS

| | | | |
|---|---|---|---|
| 2,984,011 | 5/1961 | Hamilton | 33/264 |
| 3,064,617 | 11/1962 | Meagher | 33/264 X |
| 3,159,917 | 12/1964 | Whitehead | 33/264 |
| 3,765,703 | 10/1973 | Voelkerding | 33/264 X |

*Primary Examiner*—Richard E. Aegerter
*Assistant Examiner*—Charles E. Phillips

[57] ABSTRACT

A visual aid to assist a driver in maneuvering a vehicle having a first engagable portion of a trailer hitch on the rear part thereof to a position relative to a trailer having a second engaging portion of the trailer hitch on the forward part thereof so as to align the engagable and engaging portions in a manner such that they can be removably engaged together, the visual aid guide device comprised of an extension member adapted to be fit on the bottom of the ball portion of the engagable portion mounted on the vehicle and having a pair of guide rods projecting longitudinally outwardly therefrom and spaced transversely apart with each guide rod having a vertically extending flag staff projecting upwardly therefrom into the line of vision of a driver looking through the rear window of the vehicle with the projecting ends of the rods adapted to engage the sides of a jack holding the socket engaging portion of the hitch of the trailer in an elevated position with the movement of the flag staff designating the direction in which the ball portion of the hitch must be moved in order to be properly aligned with the socket portion so as to properly align the same therebeneath in position for the socket portion to be dropped onto the ball portion to engage the same.

4 Claims, 4 Drawing Figures

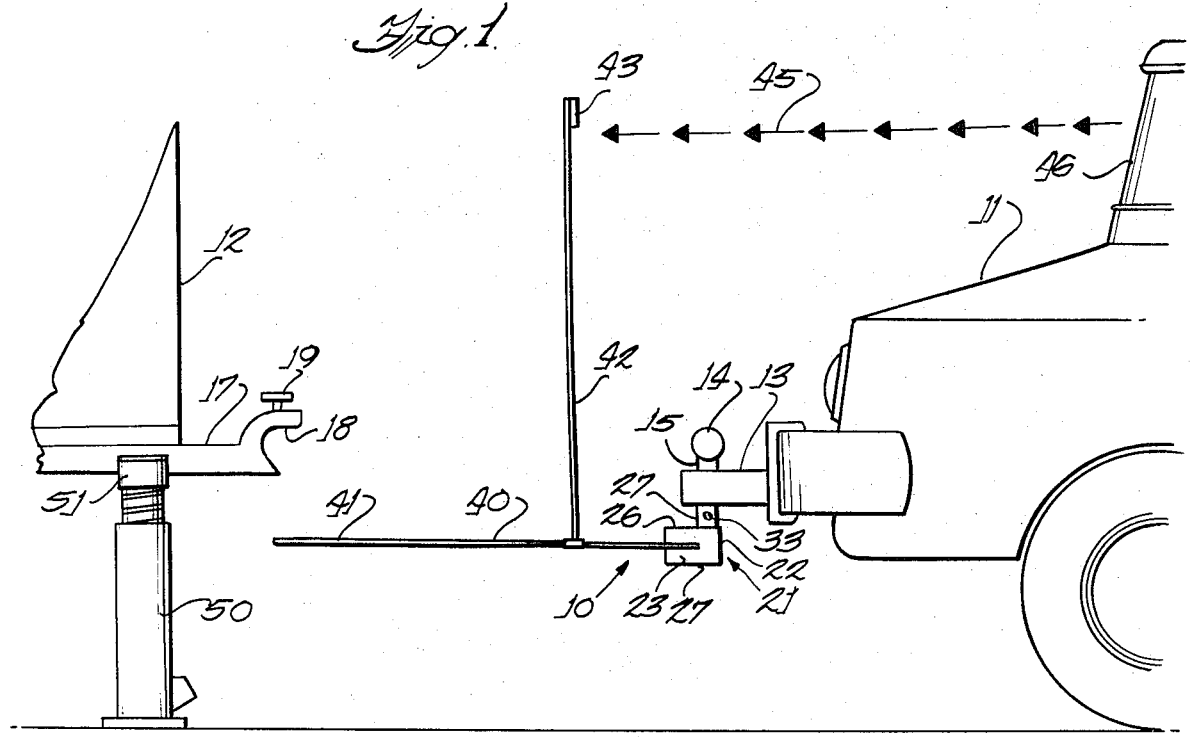
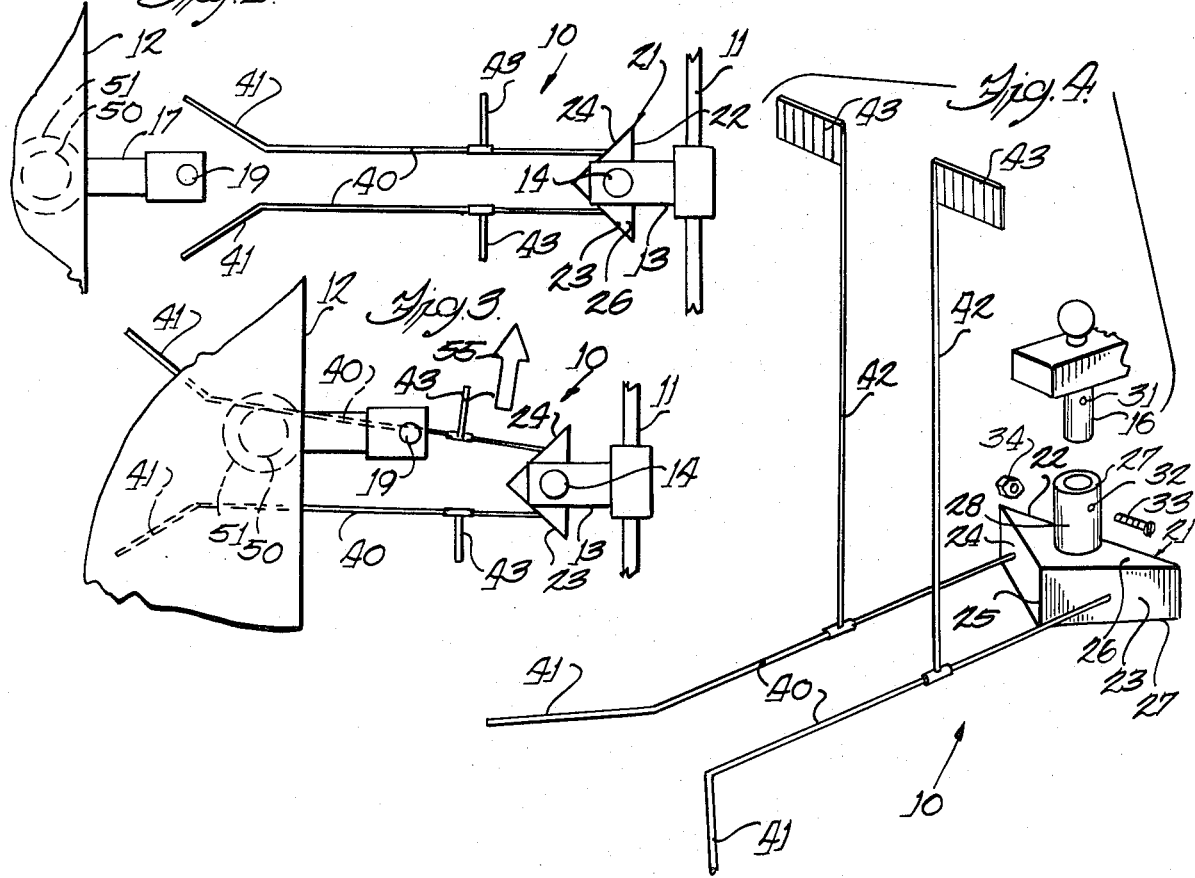

TRAILER HITCH GUIDE

BACKGROUND OF THE INVENTION

1. Field of the Invention

The present invention relates generally to automotive accessories and more particularly to a novel visual aid trailer hitch guide device adapted to be removably mounted on a vehicle and trailer to visually indicate to the driver of the vehicle when the interlocking portions of the trailer hitch are in alignment and may be placed in engagement with each other.

2. Description of the Prior Art

The use of trailers that are drawn by automotive vehicles has increased tremendously in the past years, and during this period a variety of trailer hitches have been developed with the most commonly used trailer hitch being the one that includes a spherical ball member supported in an upwardly extending position from the rear portion of the automotive vehicle and which is adapted to be engaged by a semi-cylindrical socket supported forwardly of the trailer and which is adapted to be detachably attached to the ball to permit the trailer to pulled by the automotive vehicle. While this type of trailer hitch is quite satisfactory, the disadvantage thereof as well the disadvantage of other hitches of different structures is that when they are used for pulling a trailer by an automotive vehicle the driver of the vehicle cannot see the hitch such that is extremely difficult and quite frustrating for the driver of the vehicle to maneuver the vehicle in a manner to initally vertically align the two hitch portions so that they may be placed in engagement. This is especially critical when the trailer is of the house trailer type and is so heavy that it is difficult if not impossible to shift the position of the trailer by hand such that it is important that the automotive vehicle be brought into the exact position for coupling of the trailer to the vehicle.

This difficulty of aligning the two hitch portions is so great that even highly skilled drivers normally require the assistance of a second individual who is stationed outside the vehicle where they can view the hitches and which then use audible or hand signals to the driver to assist the driver in maneuvering the vehicle into a position where the portion of the hitch mounted on the vehicle is in vertical alignment with the portion of the hitch supported and mounted on the trailer. This vertical alignment of the trailer supported portion of the hitch is required to permit lowering thereof into engagement with the hitch portion supported from the vehicle.

However, even when a second individual is providing directions to the driver of the vehicle as to maneuvering the vehicle relative to the trailer for aligning the hitch portions, the backing operation of the vehicle relatively to the trailer is confusing with the driver having to watch both the trailer and the individual providing instructions for the backing operation, and as a direct result thereof the engagement of the two hitch portions often is a time consuming and frustrating experience both to the driver as well as to the individual attempting to assist the driver in maneuvering the vehicle.

SUMMARY OF THE INVENTION

The present invention recognizes the difficulties in aligning the hitch portion of the vehicle with the hitch portion on the trailer for engagement thereof, and provides a novel solution thereto in the form of a visual aid to assist the driver in properly maneuvering the vehicle for alignment of the hitch portion.

It is a feature of the present invention to provide a trailer hitch guide for visually assisting the vehicle driver in aligning the two portions of the trailer hitch during the backing up operation of the vehicle relative to the trailer so as to place the portions in vertical alignment with the trailer supported socket portion then being lowerable into engagement with the vehicle supported ball portion and engaged thereto, this hitching operation being carried out without requiring the assistance or instruction of a second person standing outside the vehicle and providing instructions to the vehicle driver.

A further feature of the present invention provides a visual guide for aligning the two portions of a trailer hitch with the guide being adapted to be removably mounted on the socket portion of the hitch supported on the vehicle when needed, and when not in use the guide device being readily stored in either the trailer or the automotive vehicle.

Among the further features and advantages of the present invention is the provision of a visual aid trailer hitch guide which is relatively simple in its contruction and which therefore may be readily manufactured at a relatively low cost and by simple manufacturing methods; one which is possessed of few parts and which therefore is unlikely to get out of order; one which is rugged and durable in construction and which therefore may be guaranteed by the manufacturer to withstand many years of usage; one which is easy to use and reliable and efficient in operation; one which requires no elaborate plant facilities for its production; one which is fabricated from standard commercially available materials; one which can be retailed at a sufficiently low prices to encourage the widespread use thereof; and one which is otherwise well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a side elevational view of the two portions of the trailer hitch and with the trailer hitch guide of the present invention affixed to the socket portion in the intended manner;

FIG. 2 is a top plan view of the trailer hitch guide of the invention affixed to the socket portion of the trailer hitch;

FIG. 3 is a top plan view similar to FIG. 2 but with the vehicle having backed up relative to the trailer and with the trailer hitch guide designating that the two hitch portions are out of alignment and the direction in which the vehicle socket portion must be moved to bring the hitch portions into alignment; and FIG. 4 is an exploded perspective view of tha trailer hitch guide device of the present invention preparatory to being attached in the intended manner to the vehicle carried socket portion of the trailer hitch.

DESCRIPTION OF THE PREFERRED EMBODIMENT

Referring now to the drawings in detail there is illustrated a preferred form of a trailer hitch guide device constructed in accordance with the principles of the present invention and designated generally in its entirety by the reference numeral 10 with the device being illustrated as being used in conjunction with an automotive vehicle 11 and a trailer 12. The vehicle 11 is provided with a conventional trailer hitch which includes a rearwardly extending rigid member 13 which is rigidly affixed to the vehicle 11 and on which there is supported a spherical ball 14 which occupies an elevated position above the support member 13, the ball having a vertical shaft portion 15 which extends through the support member and terminates at a bottom portion 16 projecting beneath the support member. The trailer 12 is provided with the second portion of the hitch which is comprised of a supporting plate member 17 which is affixed to the trailer and projects forwardly thereof from the base thereof and is provided at is terminal end with a downward facing socket recess 18 adapted to be detachably attached to the ball 14 and to be removably secured thereto in a conventional manner by a locking device 19.

The visual aid trailer hitch guide device 10 is comprised of a wedge shaped quick on-off ball extension member 21 having a back surface 22 adapted to be placed in transverse alignment with the transverse axis of the vehicle with side faces 23 and 24 diverging in a direction outwardly from the back surface to define an apex portion 25. The wedge member is provided with a top surface 26 and a bottom surface 27. An elongated vertically extending hollow open ended cylindrical collar member 27 is provided having cylindrical side wall surfaces with one end of the collar member affixed to the wedge member top surface and with the collar member projecting upwardly therefrom and adapted to be received on bottom shank portion 16 of ball member 14. To provide for ease of attaching and detaching of the collar member to the shank portion, there is provided in the shank portion 16 a diametric bore 31 extending therethrough in a direction parallel to the transverse axis of the vehicle, with a similar diametric aperture 32 extending through collar member side walls 28 and extending parallel to wedge member back surface 22, the apertures 32 being axially aligned with aperture 31 when collar member 27 is fit over shank portion 16 and with the aligned position thereof being retained by a bolt 33 inserted axially therethrough and temporarily retained therein by a nut 34 threadedly received on the projecting terminal end of the bolt.

Secured to each of the wedge member side faces 23 and 24 approximately centrally thereof and projecting horizontally outwardly therefrom in directions normal to the plane of wedge member back surface 22 are a pair of spring tension or flexible rods 40 which are transversely spaced apart and terminate in their freely projecting ends by being bent in outward diverging directions to define feeler rod tips 41 thereon cooperating to form a funnel type arrangement. Mounted on each of the rods 40 and projecting vertically upright therefrom are flagstaffs 42 each projecting a sufficient distance upwardly therefrom such that the terminal ends thereof intercept the driver's line of vision 45 which is present when the driver peers through the rear window 46 of the vehicle during the backing up operation, the terminal end of each flagstaff provided with a flag 43 with each flag projecting in a direction away from each other and with the direction of pointing of the flag being normal to the line of vision of the driver so as to be clearly visible to the driver when viewing the same either through the back window 46 or through a conventional rear view mirror as provided in the vehicle.

In operation the trailer hitch portion is elevated in a conventional manner by a screw type jack 50 centered beneath plate 17 and having a top member 51 engaging the underneath portion of the plate with the jack then elevating the hitch such that the socket 18 is disposed at an elevated position relative to the ball 14 in a manner to permit the ball to be vertically aligned therewith such that the socket may be dropped thereonto for securing the two portions of the hitch together. The trailer guide device 10 is then affixed to the shank of ball 14 by collar 27 being temporarily affixed to bottom shank portion 16 by bolt 33 so that the spring tensioned rods 40 project rearwardly of the vehicle with the spacing between such rods being approximately equal to or slightly greater than the diameter of the jack 50. The vehicle driver then aligns the vehicle as best as he can to what he feels would place the two hitch portions in alignment with each other, and then begins the backing up operation relative to the trailer with the feeler rod tip 41 passing about the trailer jack 50 and, as long as the ball 14 is in horizontal alignment with the socket 18 the two flags 43 will retain their fixed positions relative to each other. However, as seen in FIG. 3, should ball 14 not initially be in alignment with socket 18, such as would normally be the case, then one of the rods 40 would engage a side of the jack 50 in a manner such that backing up of the vehicle would effect the spreading apart of the rods 40 thus moving one of the flags 43 in a direction away from the other flag, such as in the direction designated by arrow 55 in FIG. 3, this indicating to the driver the fact that the two hitch portions are not in alignment and the direction of movement of the flag designating to the driver the direction in which the ball portion 14 must be moved relative to the socket portion 18 to place the same in alignment thus indicating to the driver which way to maneuver the vehicle to accomplish the desired alignment.

In this manner the vehicle driver is able to align the two hitch portions and then move one portion relative to the other portion until the same are in vertical alignment so as to engage the socket 18 with the ball 14, this all being accomplished without the need for a second person standing outside the vehicle to provide instructions or any other type guide devices. Further, after the two hitch portions have been attached together then the guide device 10 is readily removable from the shaft portions 16 so as to be stored in either the trailer or the automotive vehicle until needed again.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A trailer hitch guide device for visually assisting a driver in maneuvering a vehicle having a first engageable portion of a trailer hitch secured on the rear part thereof, such as a ball socket portion, to a position relative to a trailer having a second engaging portion of said trailer hitch on the forward part thereof, such as a socket portion, so as to align said ball portion with said socket portion such that they may be removably engaged together to hitch the trailer to the vehicle, the guide device comprising:

a member adapted to be detachably attached to said ball portion and disposed beneath the same in a position not to interfere with said socket portion;

means detachably attaching said member to said ball portion of the trailer hitch;

a pair of coplanar horizontally extending spaced apart flexible rod members each having a longitudinal portion, one end of each longitudinal portion being attached to said member on either side of said ball portion, an end portion diverging outwardly from the other end of said longitudinal portion, said diverging portion of each rod member cooperating with the diverging portion of the other rod member to form a funnel-type portion which leads into a longitudinal portion which is in alignment with said ball portion;

a pair of flagstaffs, each flagstaff having one end affixed to one of said rods with the flagstaff projecting a substantial distance vertically upright therefrom and terminating at a top end which is disposed in the line of vision of the vehicle driver peering through the rear view mirror or through a back window of the vehicle while viewing the front surface of the trailer;

a pair of flag members, each flag member associated with one of said flagstaffs and permanently affixed to the top terminal end thereof, each flag projecting in a direction away from the other flag and substantially normal to the line of vision of the vehicle driver;

whereby said rods are adapted to cooperate with a jack or the like disposed beneath the socket portion of the trailer hitch for elevating the same, such that movement of one of the flag members indicates to the vehicle driver that the jack is contacting one side of the funnel-type arrangement and the ball portion is not in alignment with the socket portion and also indicates the direction in which the ball portion must be maneuvered to place the same into alignment with the socket portion.

2. The trailer hitch guide device as set forth in claim 1 wherein said means for attaching said member to said ball portion comprises an elongated cylindrical shank projecting downwardly from said ball portion to a position spaced downwardly therefrom, an elongated hollow cylindrically shaped open ended collar member having one end affixed to said member with the opposite end projecting vertically upwardly therefrom and adapted to receive said extended ball portion shank therein, and means securing said collar to said shank portion with said spring tension rods projecting normal to the transverse axis of said vehicle.

3. The trailer hitch guide device as set forth in claim 2 wherein said means affixing said collar member to said ball portion shank member with said rods extending normal to the transverse axis of said vehicle is comprised of a diametrically extending bore extending through said shank portion in a direction parallel to the transverse axis of said vehicle, a pair of diametrically aligned apertures provided in the side walls of said collar member with the axis of said apertures extending normal to the direction of said spring tension rods, said apertures adapted to be aligned with said bore when said shank portion is received in said collar member, and a bolt extending axially through said aligned apertures and bore and temporarily secured thereto by a nut fastened to the terminal projecting end thereof whereby said member is affixed to said shaft portion with said spring tension rods projecting outwardly therefrom in a direction normal to the transverse axis of said vehicle.

4. The trailer hitch guide device as set forth in claim 3 wherein said member is of a substantially flat triangularly shaped configuration having a back surface extending parallel to the transverse axis of the vehicle when the member is affixed to the ball portion shaft, a pair of inclined side wall surfaces each projecting forwardly of the back surface and diverging together to define an apex portion therebetween, a substantially flat top surface, and a substantially flat bottom surface, said collar member having said one end affixed to said flat top surface of said member, and said ends of said spring tension rods each affixed to one of said surfaces aproximately centrally thereof and projecting outwardly therefrom in a direction normal to the plane of the member back surface.

* * * * *